May 1, 1962 L. A. ERICKSON 3,032,237
CUP DISPENSER
Filed March 16, 1961 6 Sheets-Sheet 1
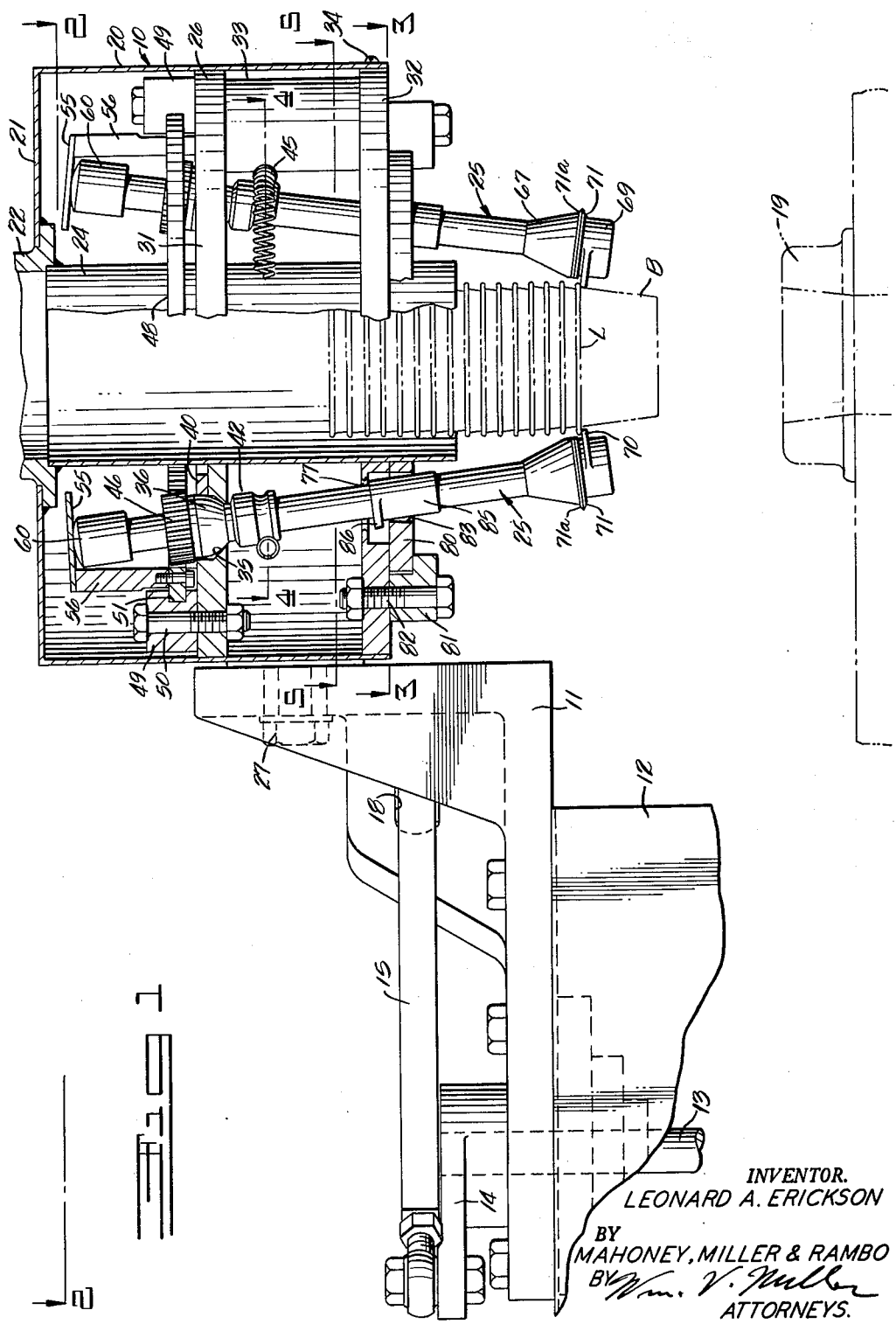
INVENTOR.
LEONARD A. ERICKSON
BY
MAHONEY, MILLER & RAMBO
ATTORNEYS.

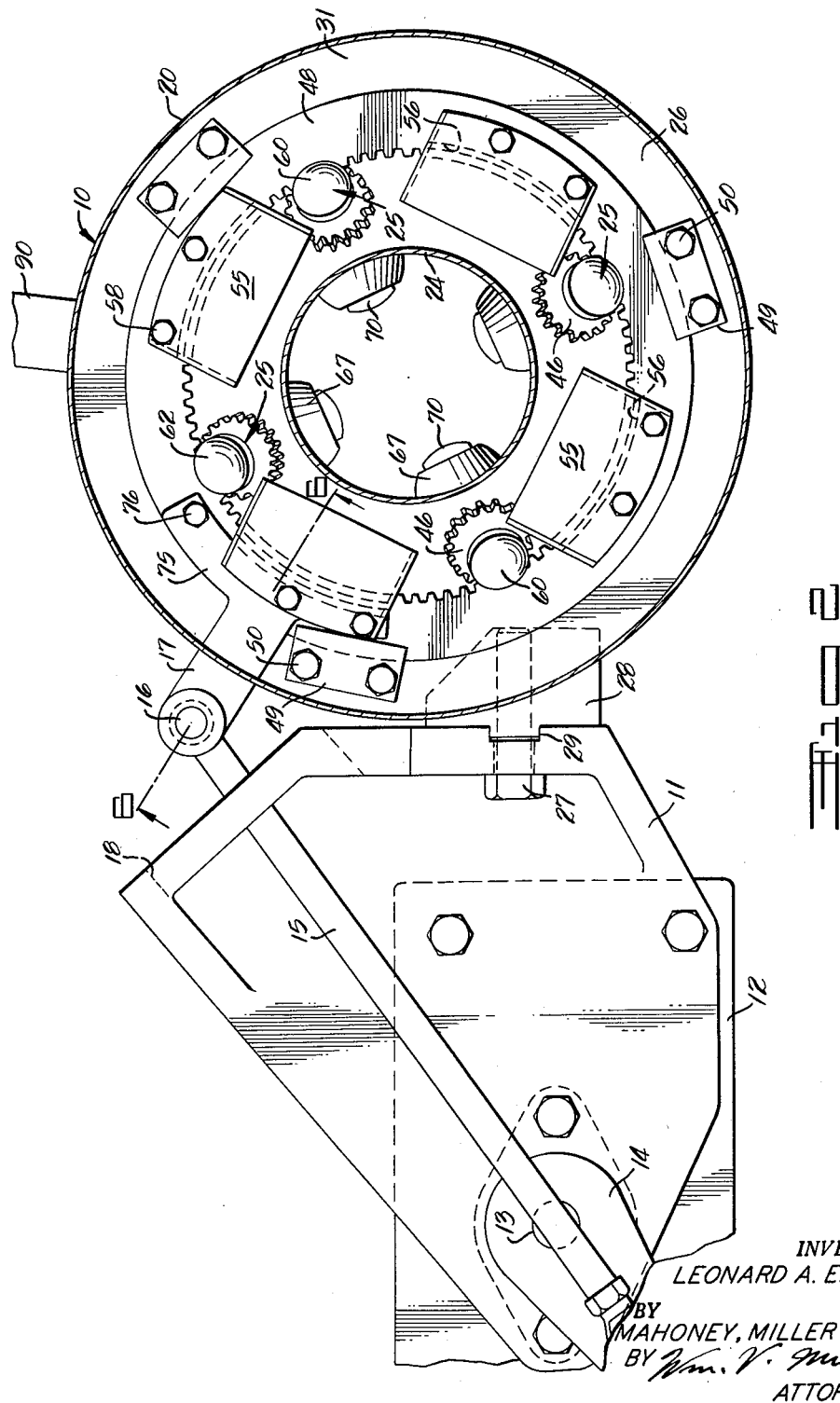

May 1, 1962   L. A. ERICKSON   3,032,237
CUP DISPENSER
Filed March 16, 1961   6 Sheets-Sheet 3
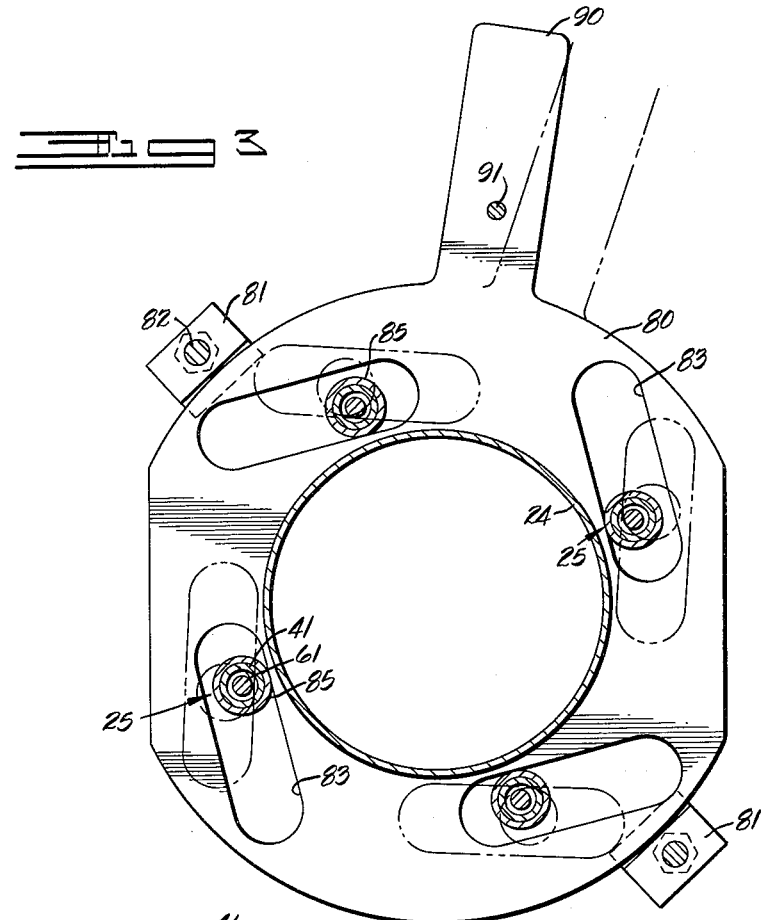
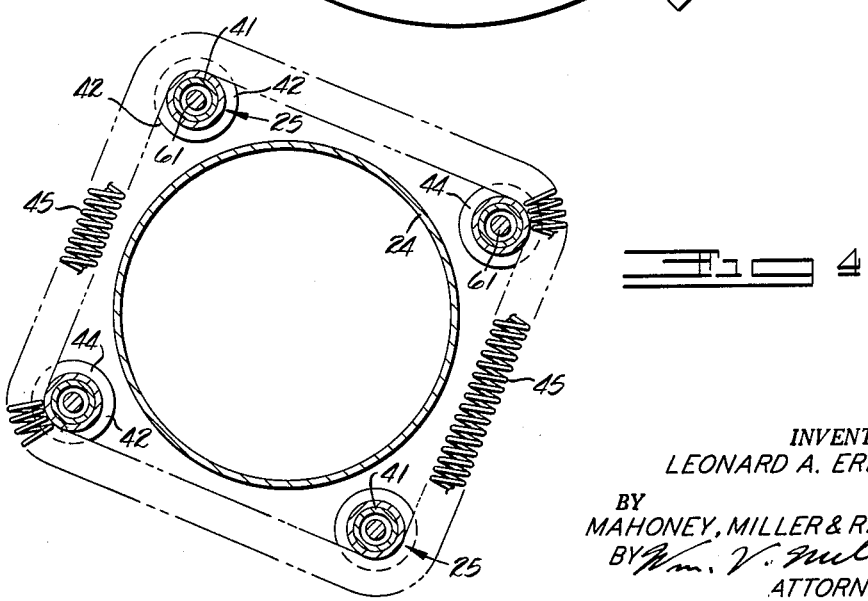
INVENTOR.
LEONARD A. ERICKSON
BY
MAHONEY, MILLER & RAMBO
ATTORNEYS.

May 1, 1962
L. A. ERICKSON
3,032,237
CUP DISPENSER
Filed March 16, 1961
6 Sheets-Sheet 4
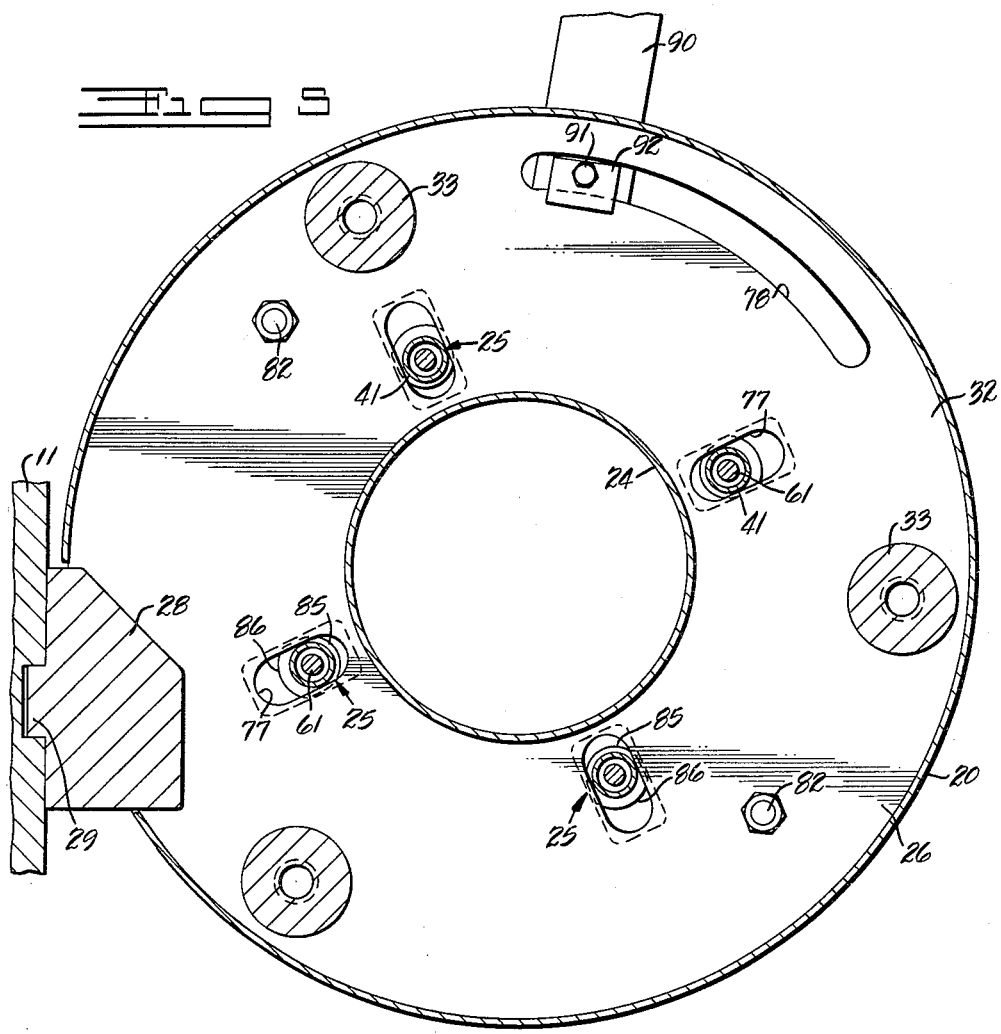
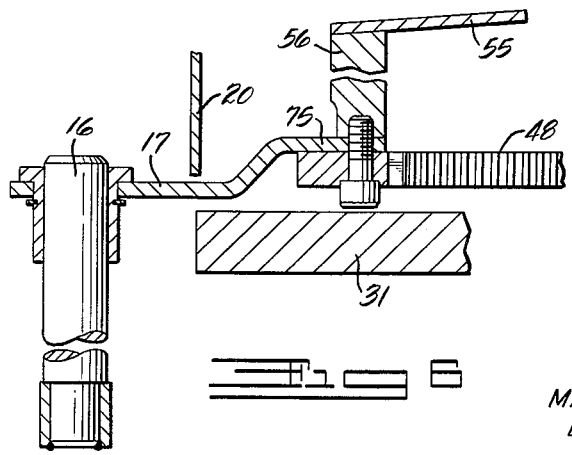
INVENTOR.
LEONARD A. ERICKSON
BY
MAHONEY, MILLER & RAMBO
BY
ATTORNEYS.

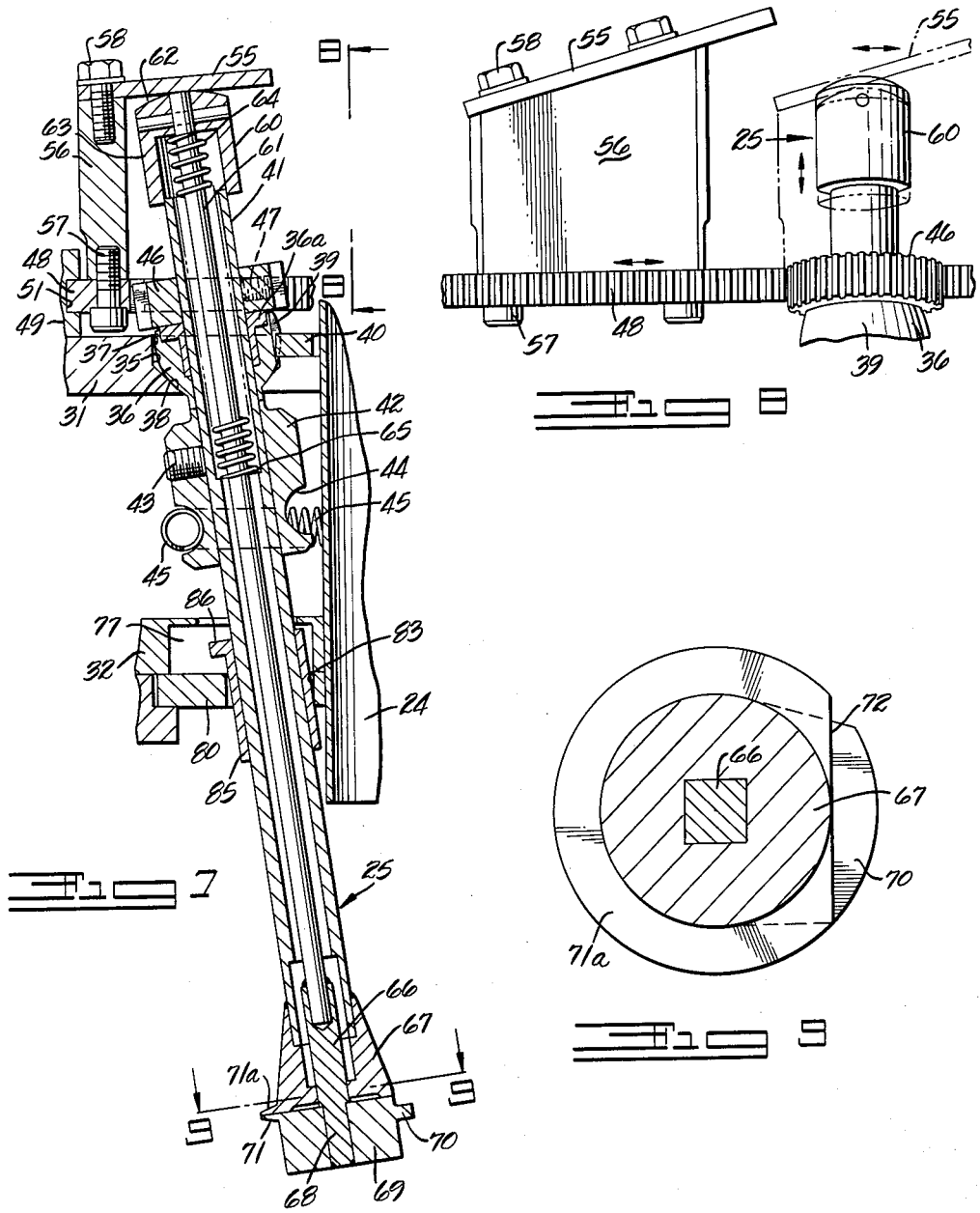

May 1, 1962 L. A. ERICKSON 3,032,237
CUP DISPENSER
Filed March 16, 1961 6 Sheets-Sheet 6
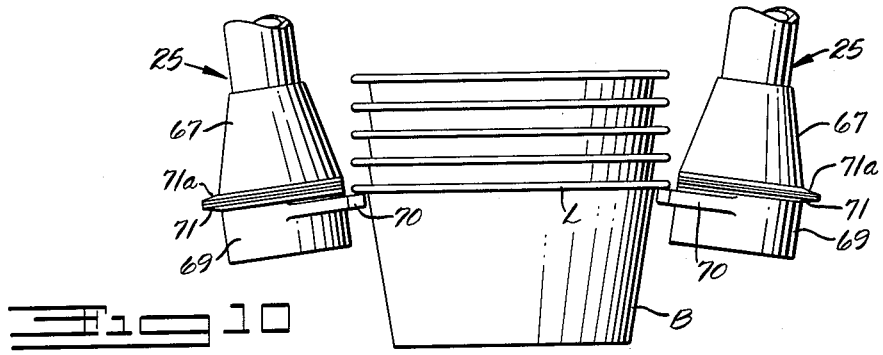
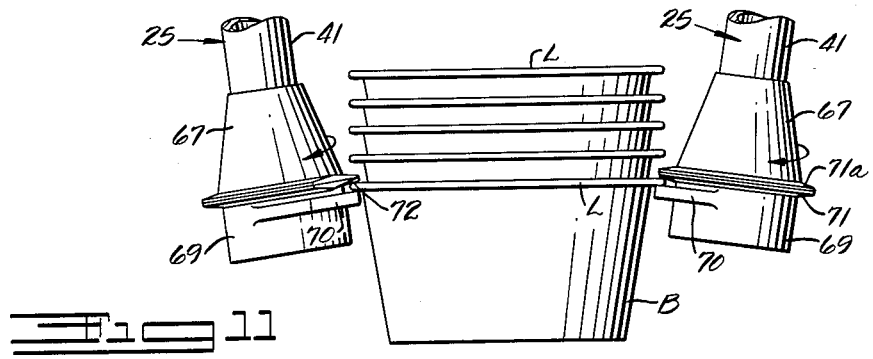
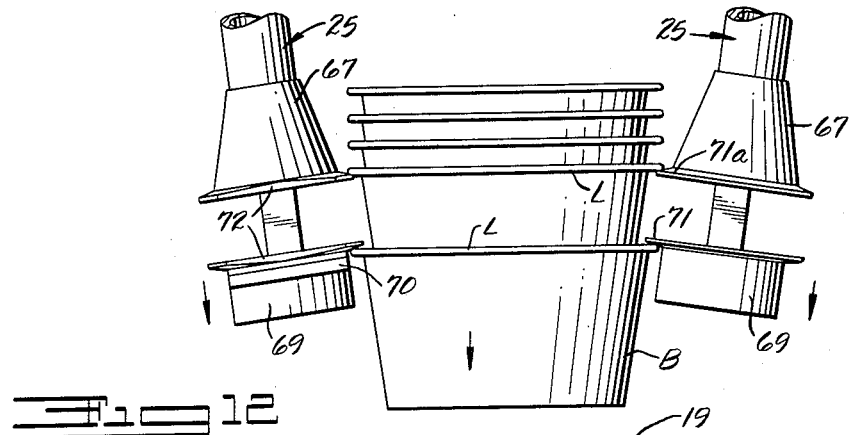
INVENTOR.
LEONARD A. ERICKSON
BY
MAHONEY, MILLER & RAMBO
BY
ATTORNEYS.

United States Patent Office 3,032,237
Patented May 1, 1962

3,032,237
CUP DISPENSER
Leonard A. Erickson, Columbus, Ohio, assignor to Drumstick, Inc., Columbus, Ohio, a corporation of Texas
Filed Mar. 16, 1961, Ser. No. 96,283
7 Claims. (Cl. 221—223)

My invention relates to a cup dispenser. It has to do, more particularly, with a cup dispensing device or attachment which is especially designed for dispensing individual cups successively from a stack or column of nested cups of the type which are of annular cross-section and which have outwardly projecting beads at their upper edges.

According to my invention I provide a device which not only will dispense individual cups as indicated above but which is capable of ready adjustment so that it has universal application to the dispensing of cups of various diameters and sizes. With prior art machines, it usually is necessary to make radical changes in a cup dispenser when a different size cup is to be dispensed. These changes usually require the substitution of different size parts in the cup-feeding mechanism. With the cup-feeding device of my present invention, when it is desired to dispense cups of a different size than those which have been dispensed, it is merely necessary to make a simple adjustment of the machine or device without substituting any parts. Furthermore, the dispenser of my invention is not only of a universal type but is of simple and relatively inexpensive structure, is positive and unfailing in action to successively dispense individual cups from the lower end of a stack of the nested cups while supporting all the cups in the stack thereabove.

In the accompanying drawings, I have illustrated the preferred embodiment of my invention but it is to be understood that specific details can be varied without departing from basic principles.

In the drawings:

FIGURE 1 is a side elevational view, partly broken away, of a cup dispenser in which my invention is embodied.

FIGURE 2 is an enlarged horizontal sectional view taken along line 2—2 of FIGURE 1.

FIGURE 3 is an enlarged horizontal sectional view taken along line 3—3 of FIGURE 1.

FIGURE 4 is an enlarged horizontal sectional view taken along line 4—4 of FIGURE 1.

FIGURE 5 is an enlarged horizontal sectional view taken along line 5—5 of FIGURE 1.

FIGURE 6 is an enlarged vertical sectional view taken along line 6—6 of FIGURE 2.

FIGURE 7 is an enlarged vertical sectional view through one of the dispenser rod units and associated actuating means taken axially through the unit.

FIGURE 8 is a detail in side elevation taken substantially along line 8—8 of FIGURE 7.

FIGURE 9 is an enlarged transverse sectional view taken substantially along line 9—9 of FIGURE 7.

FIGURES 10 to 12 are diagrammatic views illustrating subsequent conditions of the dispenser rod units during the cup-dispensing operation.

With reference to the drawings, and particularly to FIGURES 1 and 2, the cup dispenser of my invention is illustrated generally by the numeral 10. This dispenser is carried by a suitable supporting bracket 11. This bracket 11 may be carried by a support 12 of a machine, for example, a cup-filling machine with which my dispenser may be associated. This machine will have a shaft 13 or other means for actuating the cup dispenser. The actuating connection between the shaft 13 and the dispenser 10 may include a horizontally swingable crank 14 on the upper end of the shaft 13 which has its outer end pivoted to a horizontally disposed connecting rod 15. The rod 15 passes through a slot 18 provided in the outer portion of the bracket 11 and is pivoted at its opposite end, by a vertically slidable pivot 16, to an actuating arm 17 for the cup dispenser 10. As will be explained more in detail hereinafter, oscillation of the arm 17 by the crank 14 and connecting rod 15 will produce actuation of the cup dispenser 10. Other dispenser actuating mechanism may be provided and the mechanism shown and described is by way of example only. The cups dispensed from the unit 10 may drop into a receiver 19 which may be part of the filling machine. However, the particular arrangement of the filling machine is not important to this invention.

The dispenser 10 includes the housing 20 which is shown as being of annular drum-like form and which has a substantially closed top 21 which has a central opening throat which receives the supporting ring 22. Any suitable type magazine (not shown) capable of receiving cups of various diameters may be provided above the rim 22.

Each of the cups for which this machine is particularly designed will comprise a body B of frusto-conical form having an outwardly projecting lip L at its upper edge. Thus, a plurality of the cups may be readily nested. Although nesting of the cups is desirable, this creates problems in the separating of them during the feeding operation. However, my dispenser is so designed that the lowermost cup of the stack is positively separated and fed downwardly from the cup next above, the dispensing of each cup occurring at a selected interval.

The lower portion of the stack of cups is disposed in a sleeve or tube 24 which has its upper end attached to the ring 22 in concentric relationship thereto and which depends therefrom through the housing 20 to a level below the lower edge of the housing. The stack of cups is supported in this position, as indicated in FIGURE 1, by means of a plurality of cup dispenser rod units 25. Four of these rod units are shown on the machine, as indicated in FIGURE 2, but any other suitable number may be employed. As will be explained in detail later, the rod units are radially adjustable relatively to function with cups of various diameters and the tube 24 is sufficiently large to receive the maximum size cup for which the machine is designed.

The dispenser rod units 25 are supported at equally angularly spaced positions by means of a head casting or member 26 of annular form which is disposed within the housing 20. This casting 26 is vertically adjustably secured to an upstanding portion of the bracket 11 by means of a bolt and slot connection 27 (FIGURES 1 and 2) which cooperates with a lug 28 on the casting 26. The lug 28 is keyed for vertical sliding movement to the casting 26 by a slide key arrangement 29.

The casting 26 includes the upper ring 31 and the lower ring 32 which are integrally joined by vertically extending spacers 33 disposed at suitable angularly spaced intervals. The tube 24 extends downwardly concentrically through this casting and, as indicated above, the housing 20 surrounds the casting, the housing, the ring 22, and the tube 24 all being rigidly joined together. The housing 20 is provided with a cut-out for receiving the lug 28. The housing may be secured to the casting 26 by suitable means such as by screws 34 (FIGURE 1). If desired, the housing may be extended (not shown) over the bracket 11 and associated parts.

The upper ring 31 of the casting 26 supports the various dispenser rod units 25, as shown in FIGURES 1, 2 and 7. For this purpose, at angularly spaced intervals, the ring 31 is provided with sockets 35 for receiving bearing members or partial ball members 36 which provide spherical surfaces for engagement with the sides of the sockets 35. It will be noted from FIGURE 7 that each socket 35 includes an upper vertical annular wall portion 37 and a lower annular and inwardly inclined surface or wall 38. At the inner vertical surface of the ball member 36, it is provided with a vertical notch 39 which receives a key 40 for preventing rotation of the member 36 in the socket 35 about its own axis but which permits rocking of the member 36 in the socket in a radial direction relative to the ring 31.

Each ball member 36 carries a bushing 36a at its upper side and through this bushing 36a passes the outer tube 41 of the rod unit 25. Below the ball member 36 is a collar 42 which is held in fixed position on the tube 41 by means of a setscrew 43. This collar 42 is provided with an annular groove 44 which receives a tension garter spring 45 which surrounds all of the units 25 below the ring 31 and tends to swing all of them inwardly by rocking the balls 36 inwardly of the sockets 35 (FIGURES 1 and 4).

Above the ball 36 and the bushing 40 carried thereby, a gear or pinion 46 surrounds the tube 41 and is fixed thereto by means of a setscrew 47. Each of the pinions 46 meshes with the ring gear 48 which surrounds the upper portions of all of the units 25. This ring gear 48 is disposed above the ring 31 and is held in concentric relationship thereto by means of a plurality of angularly spaced blocks or guides 49, which may be of nylon or other other suitable material, and which are bolted to the ring 31 by means of the bolts 50. The inner edges of the guides 49 are provided with guide notches 51 which receive the outer edge of the ring gear 48 so that it can slide therein and rotate relative to the ring 31. Thus, it will be apparent that the garter spring 45 will tend to rock the ball members 36 in the sockets and keep the pinions 46 in engagement with the ring gear 48. The teeth of these gears 46 and 48 are of the involute type so that they will properly mesh in spite of the rocking of the ball members 36 which is accomplished by means to be described later.

The ring gear 48 carries a series of inclined plane actuating members, plates or cams 55 for actuating the respective units 25. Each of these inclined cam members 55 is inclined in two directions, viz. radially (FIGURE 7) and chordally (FIGURES 7 and 8) of the ring gear 48. The cams 55 are carried by upstanding supports 56 of arcuate form which are bolted to the ring gear 48 by bolts 57 extending upwardly through the ring gear into the lower edges of the members 56. The cams 55 are bolted to the upper inclined edges of the supports 56 by means of the bolts 58.

Each of the cams 55 is adapted to cooperate with a cam follower 60 which is pinned to the upper end of the rod or stem 61 which extends through the tube 41 and is vertically or axially movable therein. This member 60 is of inverted cup form and is provided with a spherical cam following upper surface 62. A skirt 63 thereof extends downwardly around the upper end of the tube 41 at all times, being of sufficient depth for this purpose even when the cam follower is in engagement with the upper extremity of the cooperating cam 55. A compression spring 64 presses the follower 60 upwardly at all times, this spring surrounding the stem 61 (FIGURE 7) and being positioned with its major portion within the tube 41 and with its lower end in contact with a decreased diameter surface 65 of the tube 41.

The lower end of the stem 61 is fixed to a bearing extension 66 thereof which is mounted for axial sliding movement in the collar 67 which is rigidly attached to the lower end of the tube 41. It will be noted (FIGURE 9) that the bearing extension 66 is of square cross-section so that it will not turn in the square opening in the collar 67 in which it is disposed for axial sliding movement. Fixed on the reduced lower extremity 68 of the stem extension 66 is a collar 69 (FIGURE 7). This collar 69 has a cup-supporting arcuate or segmental lip 70 projecting outwardly therefrom and extending around a portion only of the circumference of the collar 69. Extending around the greater portion of the circumference of the collar 69 is a wafer-like projection or lip 71. On the lower edge of the upper collar 67 is another wafer-like lip 71a which normally overlies the lip 71 of lower collar as shown in FIGURES 7 and 9, and which is of the same extent. It will be noted from FIGURE 9 that the lips 71 and 71a are provided with edges flattened along a line 72 tangential to the circumference of the collar 69 above the lip 70 so as not to overlie the greater extent of that lip 70. In normal cup-supporting position, as shown in FIGURE 1, the lips 70 of all units will be directed inwardly and the wafer lips 71—71a of each unit will be directed outwardly.

As previously indicated, the rocker arm 17 actuates the cup dispenser when it is oscillated. This arm 17 has an integral arcuate inner portion 75 which is bolted to the ring gear 48 by the bolts 76 (FIGURES 2 and 6). Oscillation of the arm 17 will produce oscillation of the gear 48 about its axis, the gear moving in the guides 49. This in turn will rotate all the pinions 46 of the units 25 and will move the cams 55 relative to the cam followers 60.

The lower portions of the units 25 extend downwardly through the lower ring 32 of the casting 26. This lower ring 32 is shown best in FIGURES 1, 5 and 7. The ring 32 is provided with the radially extending slots 77 through which extend the tubes 41 of the units 25. An arcuate slot 78 is provided along one edge of this ring 32. Rotatably mounted beneath this ring 32 is an iris plate 80 which is shown best in FIGURES 1, 3 and 7. This plate is supported beneath the ring 32 for rotation relative thereto and about the tube 24 by means of support lugs 81, which may be of nylon or other suitable material, which are clamped to the lower surface of the ring 32 by means of bolts 82. As shown best in FIGURE 3, the iris plate 80 is provided with slots 83 which extend crosswise of the slots 77 in the ring 32 and at an angle thereto. These slots 83 are disposed substantially tangential to the tube 24 and chordally relative to the circular edge of the iris plate 80. The tube 41 of each unit 25 carries a bearing sleeve 85 vertically slidable thereon which is positioned in the cooperating crossing slots 83 and 77 (FIGURES 1 and 7) of the respective members 80 and 32. The sleeve 85 has a flange or lip 86 at its upper end which will prevent it from dropping through the slot 83 and which will engage the edge of the slot 77 to prevent rotation of the sleeve therein.

The iris ring or plate 80 is provided with an outwardly extending radial handle 90 by means of which it may be rotated in the guides 81. This rotation of the iris member 80 relative to the ring 32 will swing the lower portions of the units 25 radially inwardly or outwardly depending on the direction of rotation of the iris member. Obviously, during this rotation the bearings 85 cooperate with the slots 77 and 83 to move the units 25 in or out.

The handle 90 is provided with a screw 91 which extends up through the slot 78 and which cooperates with a clamping lug 92 acting against the upper surface of the ring 32 to clamp the iris plate 80 in adjusted position.

The cup dispenser of this invention will function in the manner indicated diagrammatically in FIGURES 10 to 12. It will be adjusted to the proper height by means of the bolt and slot connection 27 to select the proper elevation relative to the receiver 19 to suit the height of the cup being dispensed. Normally, as shown in FIGURE 10, the lips 70 of all the units 25 will project inwardly. The units 25 will be set inwardly relative to each other so that the lips 70 thereof will project beneath the lip L of the lowermost cup in the nest or stack of cups of the size to be dispensed. The adjustment of the units 25 for a particular size cup is accomplished by moving the iris plate 80 by means of the screw 91 and clamping lug 92. With the stack of cups supported in this manner and with the wafer lips 71 and 71a in flat contact and extending outwardly, as shown in FIGURE 10, the dispenser will function upon oscillation of the ring gear 48 produced by rocking of the shaft 16 and arm 17. Turning of the gear 48 in one direction, for example, clockwise (FIGURE 2), will rotate the tubes 41 of the units 25 clockwise and will rotate the members 67 and 69 clockwise, as shown in FIGURE 11. This will gradually move the lips 70 out of supporting position for the lip L of the lowermost cup, but before this happens, the contacting wafers 71 and 71a will have been moved above that cup lip and below the lip of the cup next above. Rotation of the gear 48 in the clockwise direction also will cause the cams 55 to push the followers 60 and the stems 61 of the units 25 downwardly but this will happen subsequently to the movement of the wafers 71 and 71a into supporting position as indicated above, since the cams 55 move through a substantial distance before engaging the followers 60. As shown in FIGURE 12, the cams 55 will move the members 69 downwardly relative to the members 67 and will cause the lips 71 carried thereby to exert a positive downward thrust on the lip L of the lowermost cup, thereby causing it to drop into the receiver 19. At the same time, the wafer lips 71a of the members 67 engage the lip L of the cup next above and support it along with the rest of the stack. Reverse movement of the gear 48 will produce a reverse in the sequence of operations illustrated in FIGURES 10 to 12 so that the dispenser will again assume the condition illustrated in FIGURE 10.

It will be apparent from the above description that I have provided a cup dispenser which will positively dispense successive cups by separating the lowermost cup from the next and permitting it to drop into a suitable receiver. The dispenser is of such a nature that it may be adjusted and set easily so that it will function with cups of various diameters. Furthermore, the dispenser is not only capable of successfully dispensing cups of various sizes but it is positive and unfailing in acton to successively dispense individual cups from the lower end of a stack of the nested cups while supporting all the cups remaining in the stack thereabove.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A dispenser for dispensing articles successively from a stack comprising a plurality of dispensing units cooperable to support the stack therebetween, each of said units comprising a first supporting lip for engaging and supporting the lowermost article and a pair of upper and lower dispensing and supporting lips disposed above the first lip for movement between the lowermost article and the article next above, means for actuating each of said units to move the first supporting lip outwardly from engagement with the article and the said pair of lips simultaneously between the lowermost article and the article next above to support the latter article and any stacked thereabove, means for separating the pair of lips to cause the upper one to continue to support the article next above and the lower one to exert a positive downward force on the lowermost article, each of said dispensing units comprising a rod unit which is generally vertically disposed and which has said lips adjacent its lower end, the plurality of said units being angularly spaced to receive the cups therebetween, means for supporting each of said units for radial swinging movement and means for swinging all of said units simultaneously radially inwardly or outwardly, each of said rod units comprising a tube provided with the upper of the lips of said pair, a stem axially movable in said tube and carrying the lower lip of the pair and said first supporting lip, said pair of lips being substantially coextensive and being offset relative to the first supporting lip, said actuating means comprising means for oscillating the tube and stem about the tube axis, separating means adapted to move the stem axially relative to said tube.

2. A dispenser according to claim 1 in which said tube oscillating means comprises a pinion keyed thereto and a single gear engaging all of the pinions of the rod units, means for oscillating said gear, said means for moving the stem axially relative to said tube comprising cam means actuated upon movement of said gear.

3. A dispenser according to claim 2 in which said gear is a ring gear surrounding the tubes of all of said rod units and engaging the pinions thereof, said cam means comprising a cam carried by said ring gear and engaging a cam follower on the upper end of the stem of each of said rod units.

4. A dispenser according to claim 3 in which said means for supporting said units comprises ball and socket joints in a member which carries said ring gear so that swinging adjustment of said units will move the pinions relative to the ring gear while still maintaining meshing engagement.

5. A dispenser for dispensing articles successively from a stack comprising a plurality of dispensing units cooperable to support the stack therebetween, each of said units comprising a first supporting lip for engaging and supporting the lowermost article and a pair of upper and lower dispensing and supporting lips disposed above the first lip for movement between the lowermost article and the article next above, means for actuating each of said units to move the first supporting lip outwardly from engagement with the article and the said pair of lips simultaneously between the lowermost article and the article next above to support the latter article and any stacked thereabove, and means for separating the pair of lips to cause the upper one to continue to support the article next above and the lower one to exert a positive downward force on the lowermost article, each of said dispensing units being in the form of a rod unit which is generally vertically disposed and which has said lips adjacent its lower end, each of said rod units comprising a tube provided with the upper of the lips of said pair, and a stem axially movable in said tube and carrying the lower lip of the pair and said first supporting lip in angularly offset relationship, said pair of lips being substantially coextensive, said actuating means comprising means for oscillating the tube and stem about the tube axis, said operating means adapted to move the stem axially relative to said tube.

6. A dispenser according to claim 5 in which said tube oscillating means comprises a pinion keyed thereto and a single gear engaging all of the pinions of the rod units, means for oscillating said gear, said means for moving the stem axially relative to said tube comprising cam means actuated upon movement of said gear.

7. A dispenser according to claim 6 in which said gear is a ring gear surrounding the tubes of all of said rod units and engaging the pinions thereof, said cam means comprising a cam carried by said ring gear and engaging a cam follower on the upper end of the stem of each of said rod units.

References Cited in the file of this patent

UNITED STATES PATENTS

| 2,730,268 | Moesch | Apr. 22, 1952 |
| 2,974,828 | Matteson | Mar. 14, 1961 |